US012574720B2

(12) United States Patent
Gomez et al.

(10) Patent No.: US 12,574,720 B2
(45) Date of Patent: Mar. 10, 2026

(54) METHOD AND SYSTEM FOR END DEVICE CONFIGURATION BASED ON SUBSCRIBER ATTRIBUTES AND AVAILABILITY

(71) Applicant: Verizon Patent and Licensing Inc., Basking Ridge, NJ (US)

(72) Inventors: Angel V. Gomez, Fort Worth, TX (US); Kent W. Hughes, Oakland, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 332 days.

(21) Appl. No.: 18/340,075

(22) Filed: Jun. 23, 2023

(65) Prior Publication Data

US 2024/0430665 A1      Dec. 26, 2024

(51) Int. Cl.
    *H04W 8/20*        (2009.01)
    *H04W 4/14*        (2009.01)
    *H04W 40/02*       (2009.01)

(52) U.S. Cl.
    CPC ............. *H04W 8/205* (2013.01); *H04W 4/14* (2013.01); *H04W 40/02* (2013.01)

(58) Field of Classification Search
    CPC ................................ H04W 4/14; H04W 8/205
    See application file for complete search history.

(56) References Cited

U.S. PATENT DOCUMENTS

| | | | | |
|---|---|---|---|---|
| 7,013,155 | B1 * | 3/2006 | Ruf .......................... | H04W 4/12 |
| | | | | 455/412.2 |
| 10,986,489 | B1 * | 4/2021 | Parra-Yepez ......... | H04W 76/28 |
| 2004/0192306 | A1 * | 9/2004 | Elkarat ................... | H04W 8/06 |
| | | | | 455/435.2 |
| 2015/0350888 | A1 * | 12/2015 | Miranda ................. | H04W 4/24 |
| | | | | 455/418 |
| 2021/0218825 | A1 * | 7/2021 | Sharma ..................... | G06F 8/65 |
| 2023/0011183 | A1 * | 1/2023 | Balasubramanian ....................... | |
| | | | | H04W 4/021 |

FOREIGN PATENT DOCUMENTS

WO      WO-2024112315 A1 *   5/2024   ............. H04W 8/22

* cited by examiner

*Primary Examiner* — William G Trost, IV

(57)      ABSTRACT

A method, a device, and a non-transitory storage medium are described in which a network subscription activation and configuration service is provided. The service may include a network device receiving subscription information including at least one of a short messaging service (SMS) packet data unit (PDU) format supported by an end device or an SMS delivery preference of the end device The network device also receiving availability information indicating that the end device is active on a network; selecting, based on the subscription information and the availability information, a network path from among network paths that enables delivery of a binary short messaging service (SMS) message; and transmitting, via the network path, the binary SMS message to the end device.

20 Claims, 8 Drawing Sheets

100

500

OBTAIN SUBSCRIPTION INFORMATION OF AN END DEVICE
505

RECEIVE NOTIFICATION INDICATING AVAILABILITY OF THE END DEVICE
510

SELECT A NETWORK PATH FROM AMONG MULTIPLE NETWORK PATHS BASED ON THE SUBSCRIPTION INFORMATION, AVAILABILITY INFORMATION, AND/OR A TYPE OF CONFIGURATION PROCEDURE
515

PROVISION A CARD/USIM OF THE END DEVICE
520

600

OBTAIN SUBSCRIPTION INFORMATION OF AN END DEVICE
605

RECEIVE NOTIFICATION INDICATING AVAILABILITY OF THE END DEVICE
610

SELECT A NETWORK PATH BASED ON THE TYPE OF CONFIGURATION PROCEDURE
615

TRANSMIT CONFIGURATION INFORMATION TO A CARD/USIM OF THE END DEVICE
620

700

RECEIVE NOTIFICATION INDICATING AVAILABILITY OF THE END DEVICE
705

SELECT A NETWORK PATH FROM AMONG MULTIPLE NETWORK PATHS BASED ON THE SUBSCRIPTION INFORMATION AND THE TYPE OF CONFIGURATION PROCEDURE
710

TRANSMIT CONFIGURATION INFORMATION TO A CARD/USIM OF THE END DEVICE
715

METHOD AND SYSTEM FOR END DEVICE CONFIGURATION BASED ON SUBSCRIBER ATTRIBUTES AND AVAILABILITY

BACKGROUND

Service providers, network providers, and other types of entities may manage the allocation, assignment, and configuration of subscriber identification module (SIM) cards and/or another type of logic of end devices for use in accessing various networks and application services.

DETAILED DESCRIPTION

Figure 1:
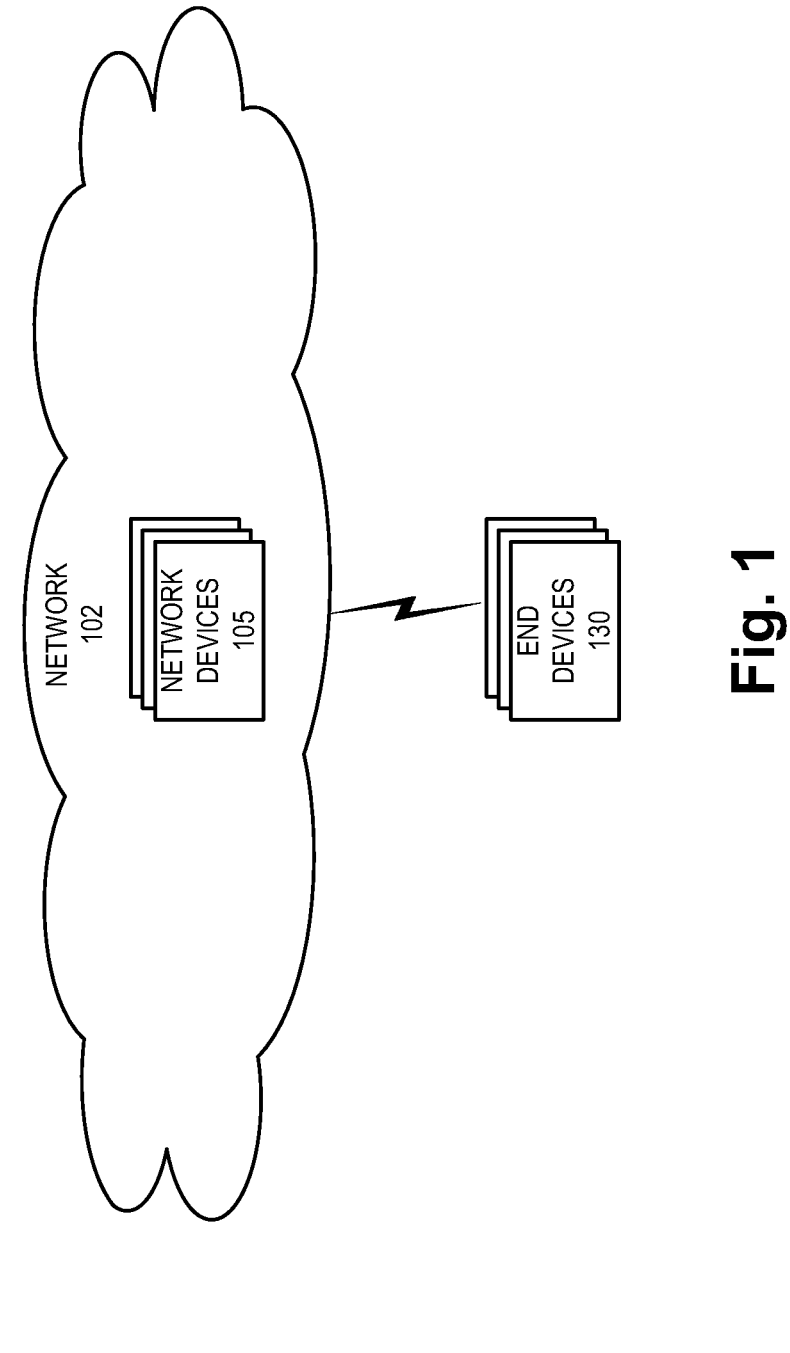
FIG. 1 is a diagram illustrating an exemplary environment in which an exemplary embodiment of a network subscription activation and configuration service may be implemented.

The following detailed description refers to the accompanying drawings. The same reference numbers in different drawings may identify the same or similar elements. Also, the following detailed description does not limit the invention.

A service provider, a network provider, a network operator, a wireless carrier, or another type of entity may have to manage various aspects of end devices that support the provisioning of wireless access to various networks and application services. For example, the entity may have to acquire, assign, distribute, and/or manage SIMs, embedded SIMs (eSIMs), Universal SIMs (USIMs), integrated SIMs (iSIMs), and/or a similar type of application, software, and/or executable (referred to herein as simply a USIM) that may be used by various types of end devices to enable the end devices to access a network, among other things. A card may be implemented as a SIM card, an eSIM card/chip, a Universal Integrated Circuit Card (UICC), an embedded UICC, a secure element (SE), an integrated trusted execution environment (TEE), a chip or the like, which may include hardware and may include various types of data, an application, software, an operating system (OS), and/or other types of executables that may be stored on and executed by the card, for example. After provisioning, the card may host a profile, which may include subscription data, security authentication and ciphering information, network configuration information (e.g., roaming files/configuration, etc.), applications (e.g., USIM, etc.), algorithms (e.g., encryption, decryption, etc.), and so forth.

An over-the-air (OTA) network device may transmit profiles, as a part of initial activation of cards and/or USIMs (also referred to as "cards/USIMs") of end devices, and transmit other configuration information (e.g., post-activation configuration information, updates, etc.) after activation of the cards/USIMs. The OTA network device may transmit this information via an intermediary device, such as a gateway device. For example, an OTA server device may connect to a Long Term Evolution Short Messaging Service (LTE SMS) gateway using a Short Message Peer-to-Peer (SMPP) protocol to support the delivery of a binary SMS to a card/USIM for programming, configuration, and/or process execution. However, when the end device is not connected to a network or the intermediary gateway is unable to find the end device, the profile or other configuration information may be dropped by the intermediary gateway. Additionally, the OTA network device may not have an established connection with a Short Message Service Center (SMSC) device and the SMSC device may not support binary SMS reformatting (e.g., converting from a Third Generation Partnership Project 2 (3GPP2) to a 3GPP message or vice versa). For example, a 3GPP2 SMS packet data unit (PDU) format is different from a 3GPP SMS PDU format. The SMSC device may incorrectly reformat the PDU of a binary SMS (e.g., non-textual data, non-human-readable data). The OTA network device may also not have information pertaining to the attributes and/or availability of the end device, the ability to determine the best delivery path of a binary SMS, and/or SMS routing decision-making functionality. Based on the aforementioned deficiencies, there is a need in the art to provide a more optimal infrastructure that facilitates the activation, provisioning, and configuration of cards/USIMs associated with end devices.

According to exemplary embodiments, a network subscription activation and configuration service is described. According to an exemplary embodiment, a network device may include logic of the network subscription activation and configuration service, as described herein. For example, the network device may be implemented as an OTA server device, a card/USIM management device, an end device management device, a subscription management device or another type of network device that may activate and update cards/USIMs or the like of end devices (referred to herein as simply an OTA server device).

According to an exemplary embodiment, the network subscription activation and configuration service may securely query a business device, a platform, or another type of intermediary device of a network (referred to simply as "intermediary network device") via an interface, such as an application programming interface (API), which enables the network subscription activation and configuration service to acquire and store subscription attribute and availability information of relevance to an end device.

According to an exemplary embodiment, the network subscription activation and configuration service may query a network via the interface and the intermediary network device for the subscription attribute and availability information. The network subscription activation and configuration service may obtain, based on a response from the intermediary network device, the subscription attribute and availability information. The network subscription activation and configuration service may store and use the subscription attribute and availability information for prospective delivery of the configuration information to the card/USIM of the end device.

According to another exemplary embodiment, the network subscription activation and configuration service may query the network directly via the interface and obtain the subscription attribute and availability information. The network subscription activation and configuration service may store and use the subscription attribute and availability information for prospective delivery of the configuration information to the card/USIM of the end device. For example, the network subscription activation and configuration service may determine and/or select an optimal SMS routing path based on the subscription and availability information.

According to an exemplary embodiment, the subscription attribute information may include data pertaining to SMS. For example, the subscription attribute information may indicate an SMS PDU format (e.g., 3GPP, 3GPP2, proprietary, or the like). The subscription attribute information may include data indicating a delivery preference for SMS. The subscription attribute information may include data indicating a class of service (CoS), as described herein. For example, the network subscription activation and configuration service may determine and/or select an optimal SMS routing path based on the subscription and availability information.

According to an exemplary embodiment, the OTA server device may include interfaces that enable connection with an SMS gateway, an SMPP gateway, or a similar type of network device, and support delivery of configuration information to the card/USIM of the end device, as described herein. According to an exemplary embodiment, when the end device is not available, the OTA server device may request notification when the end device is active or online in the network. When the end device is active or online in the network, the OTA server device may select the most optimal SMS routing path based on the subscription attribute and availability information. For example, the OTA server device may select a network path from among multiple end-to-end network paths. By way of example, the OTA server device may select a first network path via an SMPP gateway and an SMSC device to the end device or a second path via an SMS gateway to the end device. According to various exemplary embodiments, the OTA server device may perform this procedure for delivery of configuration information relating to pre-activation and/or post-activation of the card/USIM of the end device.

FIG. 1 is a diagram illustrating an exemplary environment 100 in which an exemplary embodiment of a network subscription activation and configuration service may be implemented. As illustrated, environment 100 may include a network 102. Network 102 may include network devices 105. Additionally, as illustrated, environment 100 may include end devices 130 (also referred to individually or generally as end device 130).

The number, type, and arrangement of networks illustrated and described in environment 100 are exemplary. For example, according to other exemplary embodiments, environment 100 may include fewer networks, additional networks, and/or different networks.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices illustrated and described are exemplary. For purposes of description, an end device is not considered a network device.

Environment 100 includes communication links between the network devices and between end devices and a network. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated and described in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a Fifth Generation (5G) interface, another generation of interface (e.g., 5.5G, Sixth Generation (6G), Seventh Generation (7G), etc.), or some other type of interface (e.g., proprietary, etc.).

Referring to FIG. 1, network 102 may include one or multiple types of networks of one or multiple types of technologies. Network 102 may be implemented to include a cloud network, a private network, a public network, the Internet, a packet data network (PDN), a service provider network, a data center, a RAN, a core network, and/or another type of network that may provide access to and/or support of an exemplary embodiment of the network subscription activation and configuration service. The network subscription activation and configuration service may include the provisioning of configuration information to cards/USIMs of end devices 130.

According to an exemplary embodiment, network 102 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology.

Depending on the implementation, network 102 may include multiple types of network devices, such as network devices 105. According to an exemplary embodiment, network devices 105 includes a network device that provides network subscription activation and configuration service. According to various exemplary embodiments, the network device may be implemented as an OTA server device, a subscription management device, an end device management device, or a similar functioning network device that supports the activation and provisioning of end devices 130 with end device profiles and post-activation configuration information, as described herein.

As a part of the network subscription activation and configuration service, the OTA service device may include logic that obtains subscription attribute and availability information of end devices 130. The subscription attribute information may include data indicating the SMS PDU format supported by end device 130. For example, the SMS PDU format may be a 3GPP PDU format, a 3GPP2 PDU format, a proprietary format, or another type of PDU format. The subscription attribute information may also indicate an SMS delivery preference. For example, the delivery preference may indicate at least one of Signaling System 7 (SS7); Internet Protocol Multimedia SubSystem (IMS); IMS and SS7; IMS gateway and SS7; IMS, fallback to SS7, then fallback to BMGW with Home Subscriber Server (HSS); IMS with Global System for Mobile Communications (GSM) encoding; IMS with GSM, fallback to SS7; IMS with GSM, fallback to Gateway; Diameter delivery to a Mobility Management Entity (MME); or SMS over non-access stratum (NAS) delivery. The delivery preference may indicate an order of priority when multiple delivery preferences are indicated.

The availability information may include data indicating a network address of end device 130 (e.g., an IP address, etc.), a location of end device 130, a RAN device (e.g., eNB, gNB, etc.) and/or a core device (e.g., MME, access and mobility management function (AMF), packet gateway (PGW), user plane function (UPF), etc.), a network slice identifier, a bearer identifier, a flow identifier, an external network device (e.g., associated with an IMS network, a data network, or another type of network external from a RAN and/or a core network). The availability information may be associated with an attachment and/or connection with the network by end device 130. The attribute and/or availability information may include one or multiple identifiers pertaining to end device 130 and/or the card/USIM. For example, the identifier may include an International Mobile Equipment Identity (IMEI), an International Mobile Subscriber Identity (IMSI), a Subscription Permanent Identifier (SUPI), a Subscription Concealed Identifier (SUCI), a mobile device number (MDN), a media access control (MAC) address, a card identifier (e.g., a SIM card identifier, a UICC identifier, etc.), a USIM identifier, and/or another type of identifier, which may be unique. The class of service may identify the importance of an SMS message and also the location where the SMS message may be stored. According to an exemplary embodiment, the binary SMS message may be a Class 2 message.

According to an exemplary embodiment, the OTA server device may store the subscription attribute information for a term of the subscription of end device 130 or another suitable time period. The OTA server device may store the availability information for a shorter time period than the attribute information. The OTA server device may be notified when end device 130 is active and/or available with a network. The OTA server device may use the subscription attribute and availability information to manage prospective configuration information delivery associated with the activation and programming of cards/USIMs of end devices 130. According to an exemplary embodiment, the OTA server device may select an optimal network path, from among multiple network paths, based on the subscription attribute and availability information, as described herein.

Additionally, network devices 105 may include various network devices of a radio access network. For example, the radio access network may be implemented to include a Fifth Generation (5G) RAN, a future generation RAN (e.g., a 5.5 RAN, a Sixth Generation (6G) RAN, a Seventh Generation (7G) RAN, or a subsequent generation RAN), a centralized-RAN (C-RAN), an Open Radio Access Network (O-RAN), and/or another type of access network (e.g., a Fourth Generation (4G) RAN, a 4.5G RAN, etc.). By way of further example, network devices 105 may include a next generation Node B (gNB), an evolved LTE (eLTE) evolved Node B (eNB), an eNB, a radio network controller (RNC), a remote radio head (RRH), a baseband unit (BBU), a radio unit (RU), a remote radio unit (RRU), a centralized unit (CU), a distributed unit (DU), a 5G ultra-wide band (UWB) node, a future generation wireless access device (e.g., a 6G wireless station, a 7G wireless station, or another generation of wireless station), and/or the like. The network device(s) of the radio access network may support communication and connectivity between end device 130 and other network devices 105 of network 102 and the network subscription activation and configuration service, as described herein.

Further, network devices 105 may include network devices of a core network. The core network may include a complementary network of the radio access network. For example, the core network may be implemented to include a 5G core network, an evolved packet core (EPC) of a Long Term Evolution (LTE) network, an LTE-Advanced (LTE-A) network, and/or an LTE-A Pro network, a future generation core network (e.g., a 5.5G, a 6G, a 7G, or another generation of core network), and/or another type of core network. Depending on the implementation of the core network, the core network may include diverse types of network devices, such as a UPF, an AMF, a session management function (SMF), a unified data management (UDM) device, a unified data repository (UDR), an authentication server function (AUSF), a network slice selection function (NSSF), a network repository function (NRF), a policy control function (PCF), a network exposure function (NEF), a service capability exposure function (SCEF), an MME, a PGW, a serving gateway (SGW), an HSS, an authentication, authorization, and accounting (AAA) server, a policy and charging rules function (PCRF), a policy and charging enforcement function (PCEF), an SMSC, an SMPP gateway, an SMS gateway (e.g., an LSGW, a 5G SMS gateway, etc.), a charging system (CS), and/or another type of network device that may be well-known but not particularly mentioned herein.

End device 130 device may include a device that has communication capabilities and computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, etc.), a computer, a gaming device, a music device, an Internet of Things (IoT) device, a drone, a smart device, a vehicular telematics unit, or other type of wireless device (e.g., other type of user equipment (UE)). End device 130 may be configured to execute various types of software (e.g., applications, programs, etc.). The number and the types of software may vary among the end devices 130.

According to an exemplary embodiment, end device 130 may operate and connect to network 102 based on a card/USIM. The USIM may include an applet or another type of program, script, software, or executable file that includes logic for a network activation procedure and a post-activation programming procedure, as described herein. End device 130 may include system software, modem logic, and/or other types of applications that may communicate with the card/USIM.

End device 130 may support one or multiple radio access technologies (RATs) (e.g., 4G, 5G, and/or future generation RAT) and various portions of the radio spectrum (e.g., multiple radio frequency (RF) bands, multiple carrier frequencies, licensed, unlicensed, millimeter (mm) wave, above mm wave, centimeter (cm) wave, etc.), various levels and genres of network slicing, dual connectivity (DC) service, carrier aggregation (CA) service, and/or other types of connectivity services.

Figure 2A:
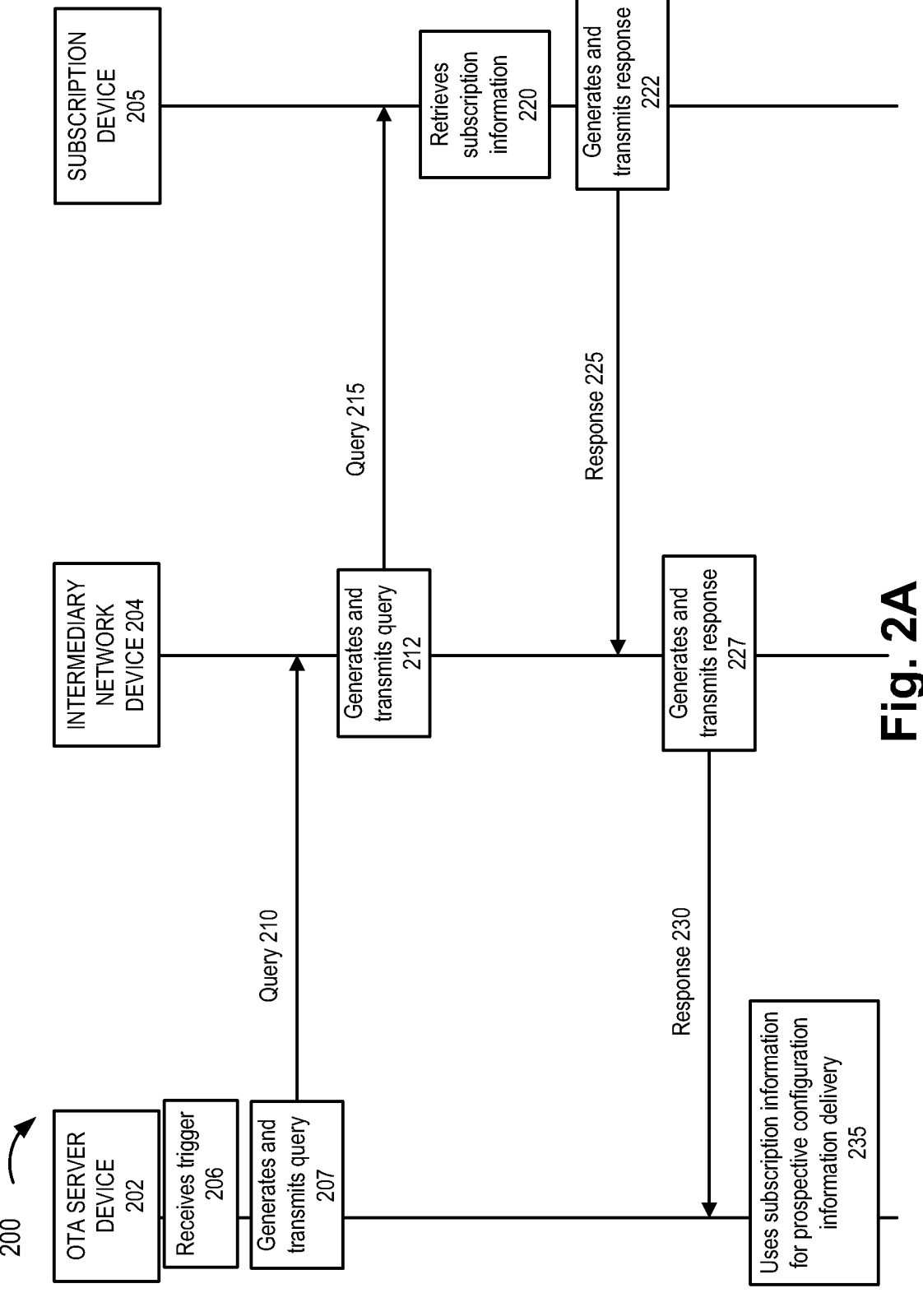
FIG. 2A is a diagram illustrating an exemplary process of an exemplary embodiment of the network subscription activation and configuration service.

FIG. 2A is a diagram illustrating an exemplary process 200 of an exemplary embodiment of the network subscription activation and configuration service. The exemplary environment, in which process 200 may be implemented, may include an OTA server device 202, an intermediary network device 204, and a subscription device 205. According to other embodiments, additional, different, and/or fewer network devices may be used to perform an exemplary embodiment of the network subscription activation and configuration service. For example, OTA server device 202 may be implemented as a network device other than an OTA server device, as described herein.

OTA server device 202 may include a network device that is configured to provide an exemplary embodiment of the network subscription activation and configuration service, as described herein. OTA server device 202 may be implemented as a single or a multi-vendor distribution platform system that includes providing end device profiles and other types of configuration information to cards/USIMS of end devices 130 as a part of an activation and programming procedure. OTA server device 202 may store and associate network-related information, such as International Mobile Subscriber Identities (IMSIs), Subscription Permanent Identifiers (SUPIs), Subscription Concealed Identifiers (SUCIs), or the like, with other identifiers, such as card identifiers (e.g., Integrated Circuit Card Identifiers (ICCIDs), SIM card identifiers, etc.), unique application identifiers for USIMs, or another type of globally unique identifier that identifies each end device profile.

Intermediary network device 204 may include a network device that interfaces with third party network devices, such as OTA server device 202. Additionally, or alternatively, intermediary network device 204 may prevent direct communication with subscription device 205 regardless of whether OTA server device 202 is a third-party network device or not. As an example, intermediary network device 204 may be implemented as a business device. According to some exemplary embodiments, intermediary network device 204 may provide security, conversion of messages, and/or routing services. Intermediary network device 204 may communicate with various upstream intermediary devices (not illustrated), such as a diameter routing agent (DRA), a NEF, a SCEF, or another type of network device of a network in order to reach subscription device 205.

Subscription device 205 may include a network device that stores subscription information of end devices 130. For example, subscription device 205 may be implemented to include an HSS, a UDR/UDM, an SMSC, a device management platform, or a similar type of subscription repository device. Subscription device 205 may reside in a core network or an external network (e.g., an IMS network, a data network, or the like), for example. The subscription information may include subscription attributes information and/or availability information, in whole or in part, as described herein. For example, the subscription attributes information may include data indicating supported SMS formatting of end device 130, a delivery preference, and/or class of service information. The subscription availability information may indicate when end device 130 is active or available on a network (e.g., a RAN, a core network, an external network, and/or the like).

Referring to FIG. 2A, OTA server device 202 may receiver a trigger 206. For example, a network device (e.g., a business platform or device) may receive activation information relating to a purchase of end device 130, a purchase of a card, a new network subscription, or another triggering event that may include the activation of a card/USIM. The network device may transmit the activation information to OTA server device 202. For example, the activation information may include a unique identifier pertaining to end device 130 and/or a card/USIM of end device 130, as described herein. The activation information may indicate that a configuration of the card/USIM relates to an activation procedure.

According to another example, the network device may receive post-activation information relating to an already-activated card/USIM of end device 130. The network device may transmit the post-activation information to OTA server device 202. The post-activation information may include a unique identifier pertaining to end device 130 and/or the card/USIM of end device 130. The post-activation information may indicate that a configuration of the card/USIM relates to a post-activation procedure.

According to other exemplary implementations, the network device may be omitted and OTA server device 202 may receive trigger communication relating to an activation and/or post-activation procedures associated with end device 130 and/or the card/USIM of end device 130. According to still other exemplary implementations, OTA server device 202 may receive a trigger communication (via the network device or not) relating to another type of procedure. For example, the procedure may relate to a verification procedure, such as verifying that the card/USIM has been activated or updated (post-activation).

OTA server device 202 may generate and transmit a query 207 based on the trigger. For example, a query 210 may include a request for subscription attribute and/or availability information pertaining to end device 130. Query 210 may include an identifier (e.g., IMSI, SUPI, a card identifier, and/or another type of identifier) pertaining to end device 130 and/or a card/USIM. OTA server device 202 may transmit query 207 to intermediary network device 204.

In response to receiving query 210, intermediary network device 204 may read query 210 and generate and transmit a query 212 (or forward query 210) to subscription device 205. Intermediary network device 204 may select subscription device 205 to which to transmit a query 215. Query 215 may include a request for subscription attribute and/or availability information pertaining to end device 130, for example. Query 215 may include one or multiple identifiers, as described herein. In response to receiving and reading query 215, subscription device 205 may perform a lookup and retrieve the requested subscription information 220. For example, subscription device 205 may select attribute and/or availability information based on an identifier. Subscription device 205 may generate and transmit a response 222 to intermediary network device 204. For example, response 225 may include subscription attribute information (e.g., supported PDU format and/or delivery preference) and/or availability information. The attribute and/or availability information may include one or multiple identifiers pertaining to end device 130 and/or the card/USIM, as described herein.

As further illustrated, in response to receiving response 225, intermediary network device 204 may generate and transmit a response 227 to OTA server device 202. A response 230 may include the subscription attribute information and/or the availability information. OTA server device 202 may receive response 230 and store the subscription attribute and/or availability information. OTA server device 202 may use the attribute and/or availability information for prospective configuration information delivery 230 to end device 130, as described herein.

Figure 2B:
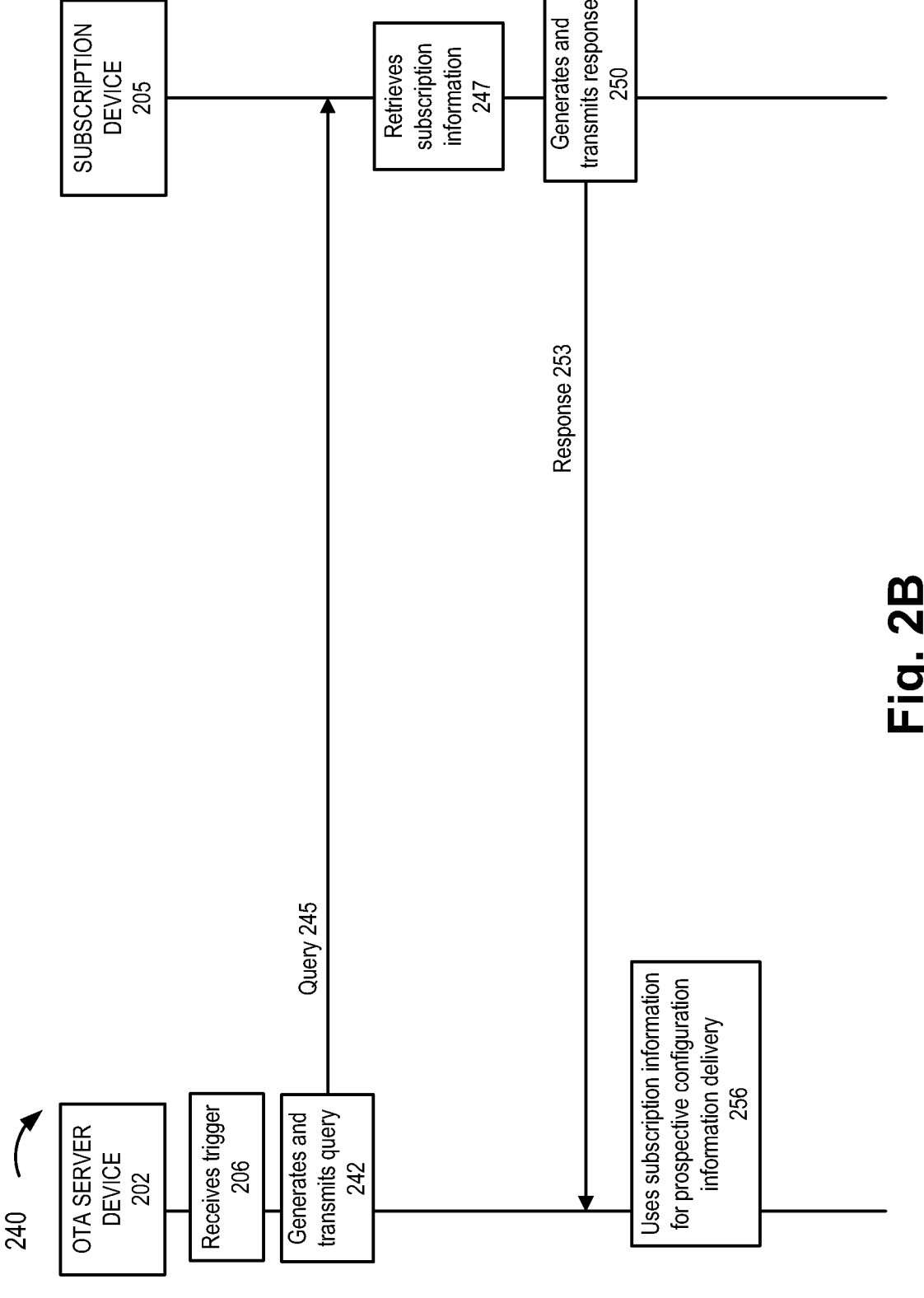
FIG. 2B is a diagram illustrating another exemplary process of an exemplary embodiment of the network subscription activation and configuration service.

FIG. 2B is a diagram illustrating another exemplary process 240 of an exemplary embodiment of the network subscription activation and configuration service. The exemplary environment, in which process 240 may be implemented, may include OTA server device 202 and subscription device 205. According to other embodiments, additional, different, and/or fewer network devices may be used to perform an exemplary embodiment of the network subscription activation and configuration service. For example, OTA server device 202 may be implemented as a network device other than an OTA server device, as described herein.

Referring to FIG. 2B, in contrast to process 200 of FIG. 2A, process 240 may be implemented without intermediary network device 204. As illustrated, OTA server device 202 may receive a trigger 206. In response, OTA server device 202 may generate and transmit a query 242 to subscription device 205. For example, a query 245 may include a request for subscription attribute and/or availability information pertaining to end device 130. Query 245 may include an identifier (e.g., IMSI, SUPI, a card identifier, and/or the like) pertaining to end device 130 and/or a card/USIM.

In response to receiving and reading query 245, subscription device 205 may perform a lookup and retrieve the requested subscription information 247. Subscription device 205 may generate and transmit a response 253 to OTA server device 202. For example, response 253 may include subscription attribute information and/or availability information. The attribute and/or availability information may include one or multiple identifiers pertaining to end device 130 and/or the card/USIM, as described herein.

As further illustrated, OTA server device 202 may receive response 253 and store the subscription attribute and/or availability information. OTA server device 202 may use the attribute and/or availability information for prospective configuration information delivery 256 to end device 130, as described herein.

Figure 3:
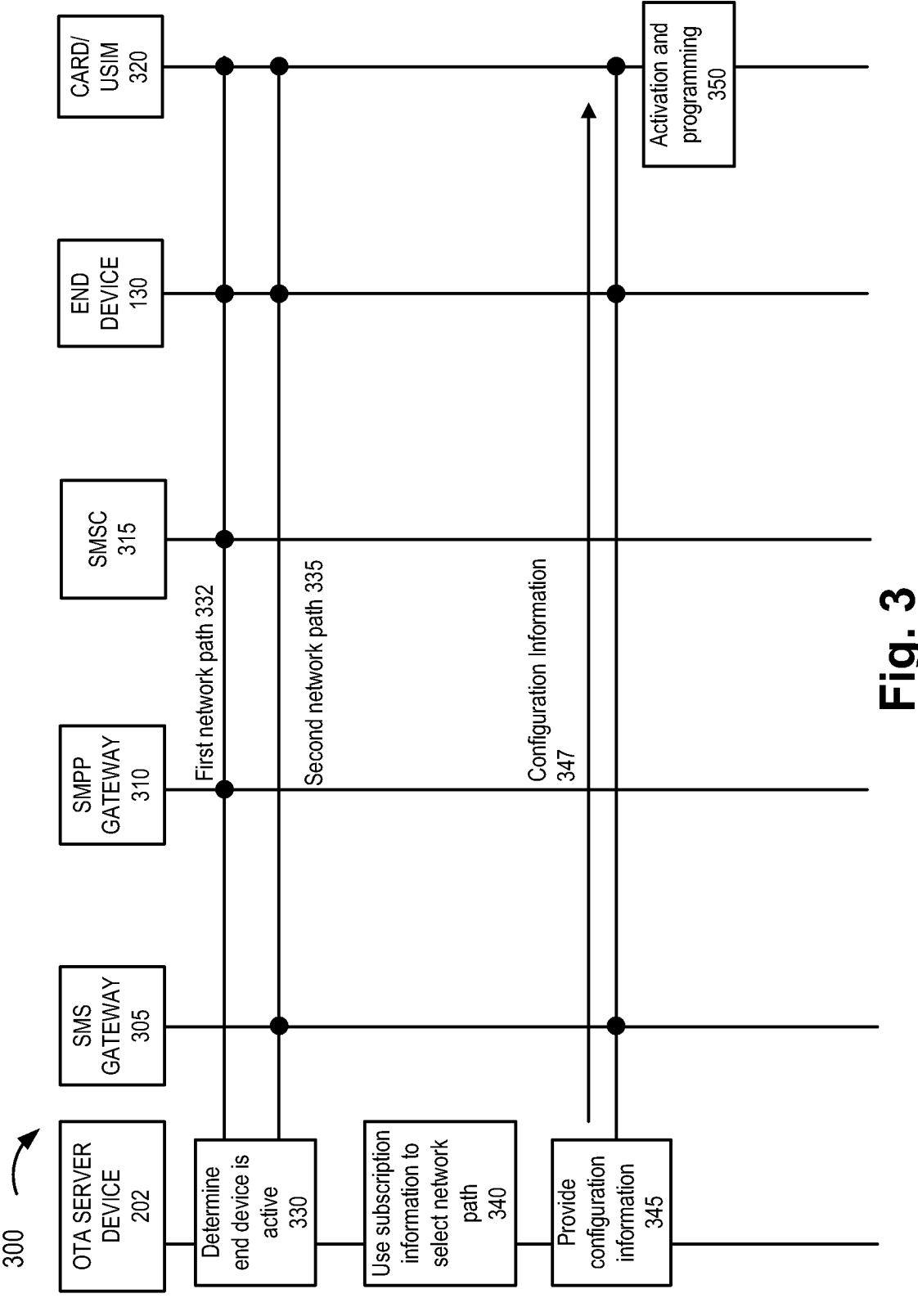
FIG. 3 is a diagram illustrating yet another exemplary process of an exemplary embodiment of the network subscription activation and configuration service.

FIG. 3 is a diagram illustrating yet another exemplary process 300 of an exemplary embodiment of the network subscription activation and configuration service. The exemplary environment, in which process 300 may be implemented, may include an SMS gateway 305, an SMPP gateway 310, an SMSC device 315, end device 130, and a card/USIM 320. According to other embodiments, additional, different, and/or fewer network devices may be used to perform an exemplary embodiment of the network subscription activation and configuration service. For example, OTA server device 202 may be implemented as a network device other than an OTA server device, as described herein. Additionally, or alternatively, network devices different from and/or in addition to SMS gateway 305, SMPP gateway 310 and/or SMSC device 315 may be implemented to provide a network path between OTA server device 202 and end device 130 for delivery of configuration information via an SMS message, as described herein.

SMS gateway 305 may include a network device that enables OTA server device 202 to send and receive SMS messages to and from end device 130. SMS gateway 305 may translate an SMS message received to enable delivery of the SMS message to its destination. SMS gateway 305 may include an SMPP interface. As previously described, SMS gateway 305 may be implemented as an LTE SMS gateway, a 5G SMS gateway, or the like.

SMPP gateway 310 may include a network device that supports the SMPP protocol and is configured to communicate SMS messages with SMSC 315. SMSC 315 may include a network device that handles SMS messages. For example, SMSC 315 may receive, store, route, and forward SMS messages. SMSC 315 may not support binary SMS reformatting.

Referring to FIG. 3, process 300 may include OTA server device 202 may determine that end device is active 330. For example, OTA server device 202 may be notified that end device 130 is attached to the network (e.g., a RAN, a core network, an IMS network, or another type of network as described herein) associated with an entity (e.g., a network operator, a service provider, or the like) that provides end device 130 a network service (e.g., a wireless network service, etc.) based on a subscription.

According to some exemplary scenarios, OTA server device 202 may receive a notification of activity of end device 130 based on a previously transmitted query, as described in relation to FIG. 2A or 2B. For example, OTA server device 202 may receive subscription attribute information but end device 130 may not be online or connected to the network. Under such circumstances, OTA server device 202 may receive a notification when end device 130 is detected as being active. For example, for an activation procedure or a post-activation procedure, subscription device 205 or another type of network device (not illustrated), such as a RAN device, a core device, or an external network device may be configured to notify OTA server device 202 when end device 130 successfully registers and/or attaches to a network, establishes a default bearer, is connected to a network slice, has established a control plane connection (e.g., non-access stratum (NAS)) with an MME or an AMF, or another network-related event pertaining to a network connection with end device 130 has occurred. The notification may include availability information, as described herein. According to other exemplary scenarios, OTA server device 202 may receive the availability information included in response 230 or response 253 of FIG. 2A or 2B, and determine that end device is active 330, as illustrated in FIG. 3.

According to this exemplary scenario, OTA server device 202 may have multiple network paths to communicate binary SMS messages with end device 130. For example, a first network path 332 may include an end-to-end path between OTA server device 202 and end device 130 via SMPP gateway 310 and SMSC 315. Additionally, a second network path 335 may include an end-to-end path between OTA server device 202 and end device 130 via SMS gateway 305. According to other exemplary embodiments, there may be additional network paths via which OTA server device 202 may communicate with end device 130. As an example, there may be multiple SMS gateways 305, such as an LTE SMS gateway and a 5G SMS gateway.

As illustrated, OTA server device 202, in response to determining that end device 130 is active, OTA server device 202 may select which network path to provision and/or configure card/USIM 320 and/or end device 130. According to an exemplary embodiment, OTA server device 202 may select which network path to use based on the subscription attribute and/or availability information. Additionally, or alternatively, according to an exemplary embodiment, OTA server device 202 may select which network path to use based on whether the configuration relates to an activation procedure or a post-activation procedure. According to some exemplary embodiments, OTA server device 202 may always select the same path for when the configuration relates to the activation procedure, but may have a binary or greater (e.g., tertiary or higher) choice when the configuration relates to the post-activation procedure. For example, when the configuration relates to the activation procedure, OTA server device 202 may be configured to select second network path 335. In some cases, this may be due to the fact that SMSC 315 may not have the MDN of end device 130. According to other exemplary embodiments, OTA server device 202 may have multiple network path choices regardless of whether the configuration relates to the activation procedure or the post-activation procedure.

As described herein, OTA server device 202 may select the network path based on the subscription attribute information, the availability information, and/or the type of configuration procedure (e.g., activation versus post-activation). According to an exemplary embodiment, when the supported PDU format is 3GPP, OTA server device 202 may select first network path 332 (e.g., which includes SMSC 315), and when the supported format is 3GPP2, OTA server device 202 may select second network path 335 (e.g., which includes SMS gateway 305). According to an exemplary embodiment, for delivery preferences that include the GSM, OTA server device 202 may select first network path 332 as the optimal network path, as well as for Diameter delivery and NAS delivery. In contrast, for delivery preferences, such as SS7; IMS; IMS and SS7; IMS gateway and SS7; and IMS, fallback to SS7, then fallback to BMGW with HSS, OTA server device 202 may select second network path 335 as the optimal network path. Based on such mappings of PDU format to network path, as well as delivery preference to network path, OTA server device 202 may select an optimal network path even when all of the attribute information (e.g., delivery preference, supported PDU format, etc.) is not obtained.

Based on the selection of the network path, OTA server device 202 may provide the configuration information 345 to card/USIM 320 via end device 130. For example, according to this exemplary scenario, OTA server device 202 may transmit configuration information (e.g., a binary SMS message) via second network path 335. Configuration information 347 may include an end device profile that enables card/USIM 320 to perform an activation procedure. According to other exemplary scenarios, configuration information 347 may relate to a post-activation procedure, such as an update, and may include configuration that may update or re-program a USIM, for example. As illustrated, in response to receiving the configuration information, card/USIM 320 may perform an activation and/or post-activation process.

FIGS. 2A, 2B, and 3 each illustrate and describe exemplary processes of exemplary embodiments of the network subscription activation and configuration service, however according to other exemplary embodiments, the network subscription activation and configuration service may include additional, different and/or fewer operations relative to those illustrated and described. The messages illustrated and described are exemplary.

Figure 4:
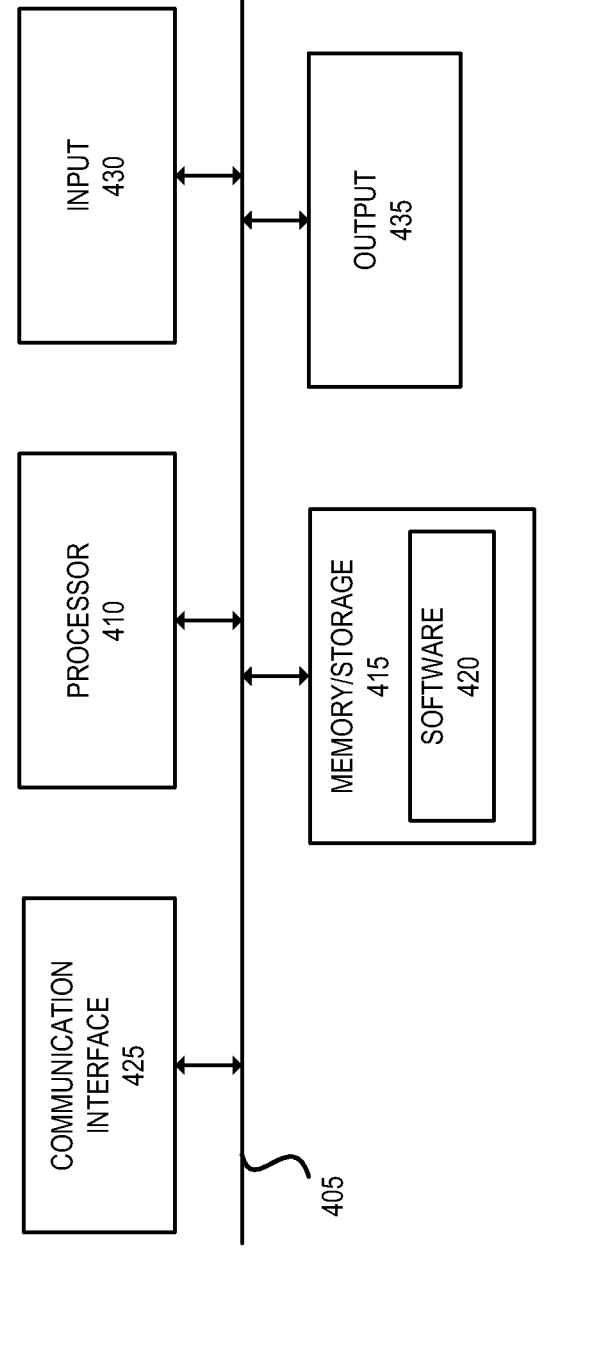
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to network devices 105, end device 130, a card or the like of end device 130, OTA server device 202, intermediary network device 204, subscription device 205, SMS gateway 305, SMPP gateway 310, SMSC 315, and/or other types of network devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to a card/USIM management device (e.g., OTA server device 202 or similar network device), as described herein, software 420 may include an application that, when executed by processor 410, provides a function and/or a process of network subscription activation and configuration service, as described herein. Additionally, with reference to end device 130, software 420 may include an application that, when executed by processor 410, provides a function and/or a process of network subscription activation and configuration service, as described herein. Software 420 may also include firmware, middleware, microcode, hardware description language (HDL), and/or another form of an executable (e.g., applet, script, or the like). Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies. For example, network devices 105 and/or end device 130, as described herein, may be a virtualized device.

Device 400 may be configured to perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 may be configured to perform a function or a process described herein based on the execution of hardware (processor 410, etc.).

Figure 5:
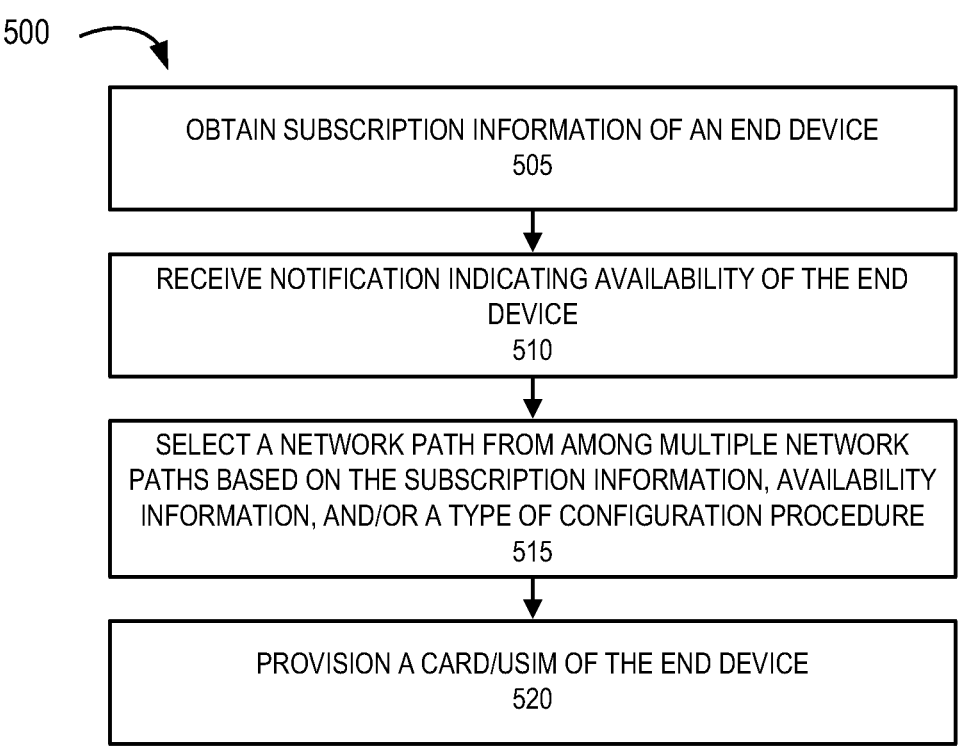
FIG. 5 is a flow diagram illustrating an exemplary process of an exemplary embodiment of the network subscription activation and configuration service.

FIG. 5 is a flow diagram illustrating an exemplary process 500 of an exemplary embodiment of the network subscription activation and configuration service. According to an exemplary embodiment, a card/USIM management device may perform a step of process 500. According to an exemplary implementation, processor 410 executes software 420 to perform the step of process 500, as described herein. Alternatively, the step may be performed by execution of only hardware. For purposes of description, process 500 is described in relation to OTA server device 202.

Referring to FIG. 5, in block 505, OTA server device 202 may obtain subscription information of end device 130. For example, OTA server device 202 may obtain the subscription information from subscription device 205 via direct or indirect communications. By way of further example, OTA server device 202 may generate and transmit a query, which may include a request for subscription attribute information and one or multiple identifiers. OTA server device 202 may obtain at least SMS PDU format information and/or SMS delivery preference information, as described herein.

In block 510, OTA server device 202 may receive a notification indicating availability of end device 130. For example, OTA server device 202 may receive availability information regarding end device 130, as described herein.

In block 515, OTA server device 202 may select a network path from among multiple network paths based on the subscription information, the availability information, and/or a type of configuration procedure, as described herein. For example, there may be an end-to-end path that includes an SMPP gateway and an SMSC. Additionally, for example, there may be an end-to-end path that includes an SMS gateway. OTA server device 202 may select the network path based on the availability information and the type of configuration procedure. Alternatively, for example, OTA server device 202 may select the network path based on the availability information and at least a portion of the subscription information (e.g., delivery preference and/or supported SMS PDU format).

In block 520, OTA server device 202 may provision a card/USIM of end device 130. For example, OTA server device 202 may transmit a binary SMS message via a selected network path that enables a card/USIM of end device 130 to be activated. Alternatively, OTA server device 202 may transmit a binary SMS message via the selected network path that enables programming or an update of the card/USIM of end device 130 associated with a post-activation procedure.

FIG. 5 illustrates an exemplary embodiment of a process of the network subscription activation and configuration service, according to other exemplary embodiments, the network subscription activation and configuration service may perform additional operations, fewer operations, and/or different operations than those illustrated and described. For example, OTA server device 202 may store the subscription attribute information for a term of the subscription or another extended period of time.

Figure 6:
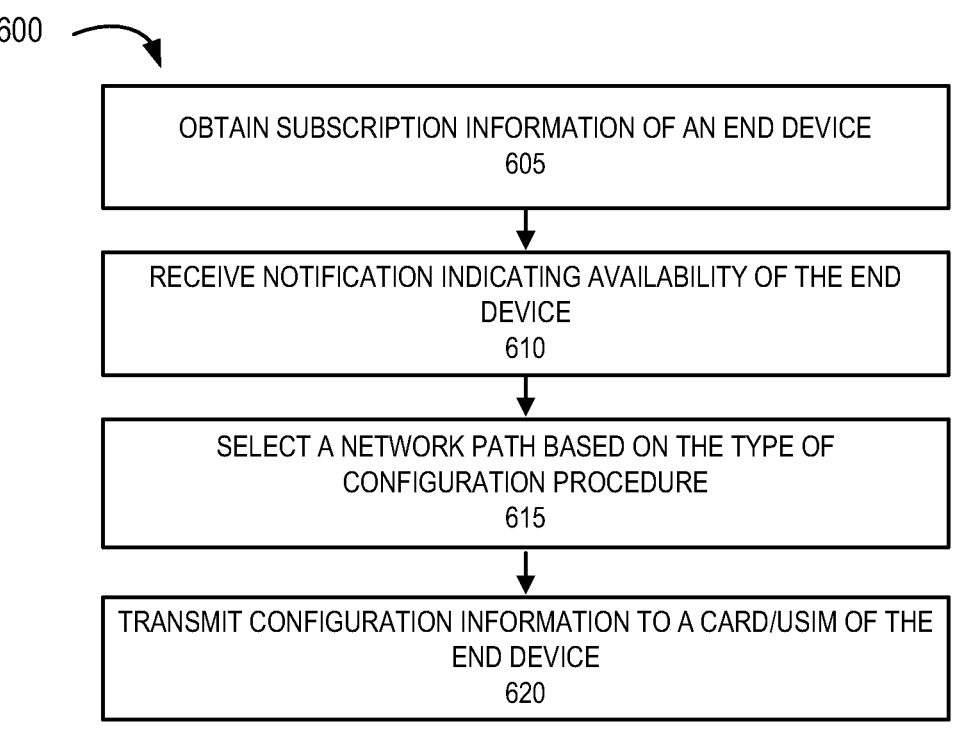
FIG. 6 is a flow diagram illustrating another exemplary process of an exemplary embodiment of the network subscription activation and configuration service.

FIG. 6 is a flow diagram illustrating another exemplary process of an exemplary embodiment of the network subscription activation and configuration service. According to an exemplary embodiment, a card/USIM management device may perform a step of process 500. According to an exemplary implementation, processor 410 executes software 420 to perform the step of process 500, as described herein. Alternatively, the step may be performed by execution of only hardware. For purposes of description, process 600 is described in relation to OTA server device 202. As an example, process 600 may be performed as a part of an activation procedure, as described herein.

In block 605, OTA server device 202 may obtain subscription information of end device 130. For example, OTA server device 202 may obtain the subscription information from subscription device 205 via direct or indirect communications. By way of further example, OTA server device 202 may generate and transmit a query, which may include a request for subscription attribute information and one or multiple identifiers. OTA server device 202 may obtain at least SMS PDU format information and/or SMS delivery preference information, as described herein.

In block 610, OTA server device 202 may receive a notification indicating availability of end device 130. For example, OTA server device 202 may receive availability information regarding end device 130, as described herein.

In block 615, OTA server device 202 may select a network path based on the type of configuration procedure. For example, OTA server device 202 may select second network path 335 as a network path to provide configuration information to a card/USIM of end device 130 for activation purposes.

In block 620, OTA server device 202 may provision the card/USIM of end device 130. For example, OTA server device 202 may transmit a binary SMS message via a selected network path that enables a card/USIM of end device 130 to be activated.

FIG. 6 illustrates an exemplary embodiment of a process of the network subscription activation and configuration service, according to other exemplary embodiments, the network subscription activation and configuration service may perform additional operations, fewer operations, and/or different operations than those illustrated and described.

Figure 7:
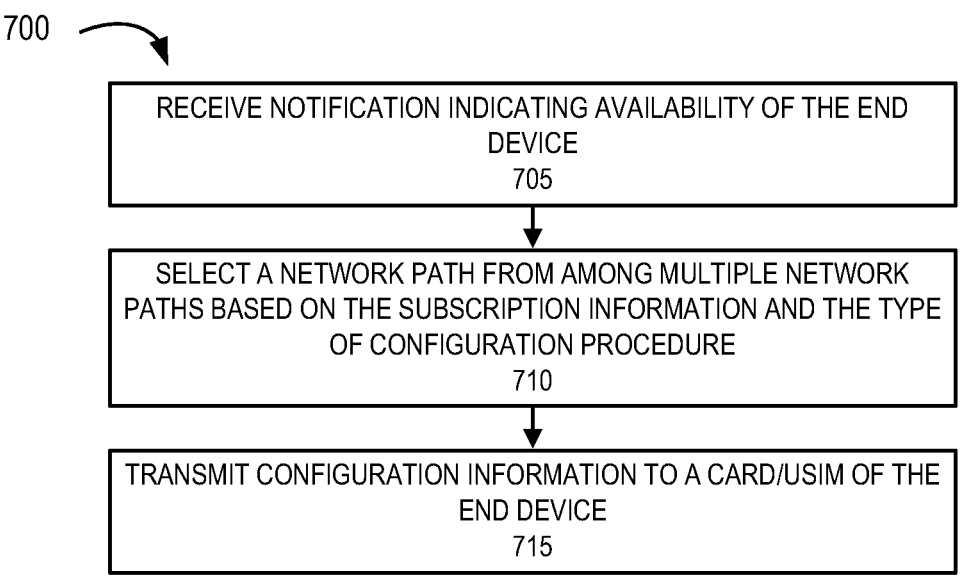
FIG. 7 is a flow diagram illustrating yet another exemplary process of an exemplary embodiment of the network subscription activation and configuration service.

FIG. 7 is a flow diagram illustrating yet another exemplary process of an exemplary embodiment of the network subscription activation and configuration service. According to an exemplary embodiment, a card/USIM management device may perform a step of process 500. According to an exemplary implementation, processor 410 executes software 420 to perform the step of process 500, as described herein. Alternatively, the step may be performed by execution of only hardware. For purposes of description, process 700 is described in relation to OTA server device 202. As an example, process 700 may be performed as a part of a post-activation procedure, as described herein.

In block 705, OTA server device 202 may receive a notification indicating availability of end device 130. For example, OTA server device 202 may receive availability information regarding end device 130, as described herein.

In block 710, OTA server device 202 may select a network path from among multiple network paths based on subscription information, the availability information, and/or a type of configuration procedure, as described herein. For example, there may be an end-to-end path that includes an SMPP gateway and an SMSC. Additionally, for example, there may be an end-to-end path that includes an SMS gateway. OTA server device 202 may select the network path based on at least a portion of the subscription information (e.g., delivery preference and/or supported SMS PDU format) and the type of configuration procedure (e.g., the configuration information to be transmitted/provisioned relates to a post-activation procedure). According to this example, OTA server device 202 may use the subscription information previously obtained and stored in relation to an (initial) activation procedure. OTA server 202 may select the network path based on a stored mapping of delivery preference to network path and/or SMS PDU format to network path, as described herein.

In block 715, OTA server device 202 may provision the card/USIM of end device 130. For example, OTA server device 202 may transmit a binary SMS message via a selected network path that enables a card/USIM of end device 130 to be updated.

FIG. 7 illustrates an exemplary embodiment of a process of the network subscription activation and configuration service, according to other exemplary embodiments, the network subscription activation and configuration service may perform additional operations, fewer operations, and/or different operations than those illustrated and described.

As set forth in this description and illustrated by the drawings, reference is made to "an exemplary embodiment,"

"exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the processes illustrated in FIGS. 5, 6, and 7 the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a network device from a subscription repository device of a core network, subscription information including a short messaging service (SMS) packet data unit (PDU) format supported by an end device and an SMS delivery preference of the end device;
   receiving, by the network device, availability information indicating that the end device is active on a network;
   selecting, by the network device based on the subscription information and the availability information, a network path from among network paths that enables delivery of a binary SMS message; and
   transmitting, by the network device via the network path, the binary SMS message to the end device.

2. The method of claim 1, wherein the network paths include a first network path that includes an SMS gateway and a second network path that includes a short message service center (SMSC).

3. The method of claim 1, wherein the binary SMS message causes the end device to perform an activation procedure.

4. The method of claim 1, wherein the binary SMS message causes the end device to perform a post-activation procedure that includes an update to a universal subscriber identity module (USIM) of the end device.

5. The method of claim 1, wherein the binary SMS message includes configuration information for at least one of a card or a universal subscriber identity module (USIM) of the end device.

6. The method of claim 1, wherein the receiving the subscription information further comprises:
   generating, by the network device, a query message that includes one or more identifiers of the end device; and transmitting, by the network device, the query message to the subscription repository device that stores the subscription information of the end device.

7. The method of claim 1, wherein the network device comprises an over-the-air (OTA) server device.

8. The method of claim 1, wherein the selecting further comprises:
   selecting, by the network device based on the subscription information, the availability information, and a type of configuration procedure from among multiple types of configuration procedures, the network path from among the network paths.

9. A network device comprising:
   a processor configured to:
   receive, from a subscription repository device of a core network, subscription information including a short messaging service (SMS) packet data unit (PDU) format supported by an end device and an SMS delivery preference of the end device;
   receive availability information indicating that the end device is active on a network;
   select, based on the subscription information and the availability information, a network path from among network paths that enables delivery of a binary SMS message; and
   transmit, via the network path, the binary SMS message to the end device.

10. The network device of claim 9, wherein the network paths include a first network path that includes an SMS gateway and a second network path that includes a short message service center (SMSC).

11. The network device of claim 9, wherein the binary SMS message causes the end device to perform an activation procedure.

12. The network device of claim 9, wherein the binary SMS message causes the end device to perform a post-activation procedure that includes an update to a universal subscriber identity module (USIM) of the end device.

13. The network device of claim 9, wherein the binary SMS message includes configuration information for at least one of a card or a universal subscriber identity module (USIM) of the end device.

14. The network device of claim 9, wherein the processor is further configured to:
   generate a query message that includes one or more identifiers of the end device; and
   transmit the query message to the subscription repository device that stores the subscription information of the end device.

15. The network device of claim 9, wherein, when selecting, the processor is further configured to:
   select, based on the subscription information, the availability information, and a type of configuration procedure from among multiple types of configuration procedures, the network path from among the network paths.

16. The network device of claim 9, wherein the network device comprises an over-the-air (OTA) server device.

17. A non-transitory computer-readable storage medium storing instructions executable by a processor of a network device, wherein the instructions are configured to:
   receive, from a subscription repository device of a core network, subscription information including a short messaging service (SMS) packet data unit (PDU) format supported by an end device and an SMS delivery preference of the end device;

receive availability information indicating that the end device is active on a network;

select, based on the subscription information and the availability information, a network path from among network paths that enables delivery of a binary SMS message; and transmit, via the network path, the binary SMS message to the end device.

18. The non-transitory computer-readable storage medium of claim 17, wherein the network paths include a first network path that includes an SMS gateway and a second network path that includes a short message service center (SMSC).

19. The non-transitory computer-readable storage medium of claim 17, wherein the instructions are further configured to:

select, based on the subscription information, the availability information, and a type of configuration procedure from among multiple types of configuration procedures, the network path from among the network paths.

20. The non-transitory computer-readable storage medium of claim 17, wherein the network device comprises an over-the-air (OTA) server device.

* * * * *